(12) United States Patent
Zhang et al.

(10) Patent No.: US 12,228,809 B2
(45) Date of Patent: Feb. 18, 2025

(54) DISPLAY MODULE, DISPLAY DEVICE AND CALCULATION METHOD

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Han Zhang, Beijing (CN); Shuwen Lai, Beijing (CN); Kai Diao, Beijing (CN); Long Hu, Beijing (CN); Liangliang Ren, Beijing (CN); Yuhang Lin, Beijing (CN); Lian Fang, Beijing (CN); Chengkun Liu, Beijing (CN); Dingjie Zheng, Beijing (CN); Zhijie Guo, Beijing (CN); Zhiying Chen, Beijing (CN); Ting Cui, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,532

(22) PCT Filed: Apr. 29, 2022

(86) PCT No.: PCT/CN2022/090588
§ 371 (c)(1),
(2) Date: Mar. 21, 2023

(87) PCT Pub. No.: WO2023/206489
PCT Pub. Date: Nov. 2, 2023

(65) Prior Publication Data
US 2024/0295766 A1    Sep. 5, 2024

(51) Int. Cl.
G02F 1/1333    (2006.01)
G02F 1/1335    (2006.01)

(52) U.S. Cl.
CPC .. *G02F 1/133314* (2021.01); *G02F 1/133524* (2013.01)

(58) Field of Classification Search
None
See application file for complete search history.

(56) References Cited

U.S. PATENT DOCUMENTS

2013/0321740 A1    12/2013    An et al.
2016/0370654 A1    12/2016    You et al.

FOREIGN PATENT DOCUMENTS

CN    204229763 U    3/2015
CN    104570448 A    4/2015
(Continued)

*Primary Examiner* — Richard H Kim
(74) *Attorney, Agent, or Firm* — WHDA, LLP

(57) ABSTRACT

A display module includes a back plate, a light guide plate, a rubber frame and a display panel, the light guide plate is fixed on a bearing surface, a connecting line between two end portions of the bearing surface forms a first curve. The first curve includes a circular arc segment and a transition curve segment, and bends in a direction away from the display panel; the circular arc segment is located at the middle, at least one end of the circular arc segment is provided with the transition curve segment; the transition curve segment is located at a first position, the first position being a position of the bearing surface opposite to a second position, the second position being a position where light leaks from the display panel, the radius of curvature of the transition curve increases along a direction close to an end portion of the first curve.

20 Claims, 4 Drawing Sheets

(56) References Cited

FOREIGN PATENT DOCUMENTS

| CN | 104965329 A | 10/2015 |
|---|---|---|
| CN | 114023202 A | 2/2022 |

DISPLAY MODULE, DISPLAY DEVICE AND CALCULATION METHOD

TECHNICAL FIELD

The present disclosure relates to the display technology, and particularly relates to a display module, display device and calculation method.

BACKGROUND

With the continuous development of display modules, display modules with curved surfaces have become a development tendency, which generally mount a display panel on a backlight with a specific curvature, the bending tendency of the display module depends on the bending tendency of the backlight, and the bending tendency of the backlight mainly depends on a metal back plate and a plastic rubber frame in the backlight.

However, in the case where the display panel is pressed or squeezed, the periphery of the display panel is slightly deformed, and in the case of aspheric bending of the display panel, that is, the display surface of the curved display panel includes an arc surface and a flat surface, the area where light leakage occurs is located in the critical position between the arc surface and the flat surface of the display panel, thereby resulting in a decrease in the display effect of the display module.

SUMMARY

Embodiments of the present disclosure provide a display module, display device and calculation method.

In view of the above technical problem, the present application is implemented as follows.

In a first aspect, an embodiment of the present application provides a display module, including a back plate, a light guide plate fixed on the back plate, a rubber frame attached on the back plate and a display panel disposed on the rubber frame; the back plate includes a bearing surface and a back surface opposite to the bearing surface; the light guide plate is fixed on the bearing surface, a connecting line between two end portions of the bearing surface forms a first curve, the first curve includes at least a circular arc segment and a transition curve segment, and the first curve bends in a direction away from the display panel; the circular arc segment is located at a middle of the first curve, and at least one end of the circular arc segment is provided with the transition curve segment; the transition curve segment is located at a first position of the bearing surface, the first position being a position of the bearing surface opposite to a second position of the display panel, and the second position being a position where light leaks from the display panel, and a radius of curvature of the transition curve segment gradually increases along a direction close to an end portion of the first curve.

Optionally, the first curve includes a first transition curve segment and a second transition curve segment; the first transition curve segment and the second transition curve segment are respectively located at both ends of the circular arc segment, and the first transition curve segment and the second transition curve segment are both located at a position of the bearing surface.

Optionally, the first curve further includes a first straight line segment and a second straight line segment; the first straight line segment is located at an end portion of the first transition curve segment, the second straight line segment is located at an end portion of the second transition curve segment, and the first straight line segment and the second straight line segment are respectively located at both end portions of the first curve.

Optionally, the first straight line segment is tangent to an end point of the first transition curve segment distal to the circular arc segment; the second straight line segment is tangent to an end point of the second transition curve segment distal to the circular arc segment.

Optionally, the first transition curve segment and the second transition curve segment are symmetrically distributed on both sides of the circular arc segment, and a center of the circular arc segment coincides with a center of the first curve.

Optionally, a radius of curvature of the first transition curve segment at a first point is equal to a radius of curvature of the second transition curve segment at a second point; a distance between the first point and the center point of the circular arc segment is equal to a distance between the second point and the center point of the circular arc segment.

Optionally, an arc length of the circular arc segment is equal to one quarter of an arc length of the first curve.

Optionally, an arc length of the transition curve segment is equal to three-eighths of an arc length of the first curve.

In a second aspect, an embodiment of the present application provides a display device including the display module described in any embodiments of the first aspect.

In a third aspect, an embodiment of the present application provides a calculation method for calculating the first curve according to the first aspect. The calculation method includes:

obtaining a cubic parabola mathematical expression of the transition curve segment, the mathematical expression has a cubic parabolic constant;

determining a value of the cubic parabolic constant of the transition curve segment based on a first value, the first value comprises an arc length of the circular arc segment, an arc length of the transition curve segment and a radius of curvature of the circular arc segment, or the first value comprises the arc length of the circular arc segment, the arc length of the transition curve segment and a chord height of the circular arc segment; and determining the first curve based on the value of the cubic parabolic constant of the transition curve segment and the first value.

Optionally, in the case where the first value comprises the arc length of the circular arc segment, the arc length of the transition curve segment, and the radius of curvature of the circular arc segment, the determining a value of the cubic parabolic constant of the transition curve segment based on a first value includes:

performing integration on the cubic parabola mathematical expression, and obtaining an integral expression;

performing a power series expansion on the integral expression, and obtaining an expansion expression, the expansion expression is a relational expression of the arc length of the transition curve segment and the cubic parabolic constant, and the expansion expression has an undetermined value;

obtaining a curvature expression of the transition curve segment, the curvature expression is a relational expression of the cubic parabolic constant, the undetermined value, and an undetermined radius of curvature;

obtaining at least one target value of the parabolic constant, and determining a target undetermined value in the expansion expression based on the target value and the expansion expression;

determining an undetermined radius of curvature value based on the target undetermined value, the target value, and the curvature expression; and when the undetermined radius of curvature value is equal to the radius of curvature of the circular arc segment, taking the target value as the value of the cubic parabolic constant of the transition curve segment.

Optionally, the expansion expression is:

$$x + \frac{x^5}{40c^2} - \frac{x^9}{1152c^4} + \frac{x^{13}}{13312c^6} - \frac{x^{17}}{111411.2c^8} = S;$$

the curvature expression is $$R = \frac{c\left(1 + \frac{x^4}{4c^2}\right)^{\frac{3}{2}}}{x},$$

where x is the target undetermined value, c is the target value, s is the arc length of the transition curve segment, and R is the undetermined radius of curvature.

Optionally, in the case where the first value comprises the arc length of the circular arc segment, the arc length of the transition curve segment and the chord height of the circular arc segment, the determining a value of the cubic parabolic constant of the transition curve segment based on a first value includes:

performing integration on the cubic parabola mathematical expression, and obtaining an integral expression;

performing a power series expansion to the integral expression, and obtaining an expansion expression, the expansion expression is a relational expression of the arc length of the transition curve segment and the cubic parabolic constant, and the expansion expression has an undetermined value;

obtaining a curvature expression of the transition curve segment, the curvature expression is a relational expression of the cubic parabolic constant, the undetermined value, and an undetermined radius of curvature;

obtaining at least one target value of the parabolic constant, and determining a target undetermined value in the expansion expression based on the target value and the expansion expression;

determining an undetermined radius of curvature value based on the target undetermined value, the target value, and the curvature expression;

determining a first target curve based on the undetermined radius of curvature value and the first value, and determining the chord height of an undetermined circular arc segment of the first target curve based on the first target curve; and when the chord height of the undetermined circular arc segment is equal to the chord height of the circular arc segment, taking the target value as the value of the cubic parabolic constant of the transition curve segment.

Optionally, the expansion expression is:

$$x + \frac{x^5}{40c^2} - \frac{x^9}{1152c^4} + \frac{x^{13}}{13312c^6} - \frac{x^{17}}{111411.2c^8} = S;$$

the curvature expression is:

$$R = \frac{c\left(1 + \frac{x^4}{4c^2}\right)^{\frac{3}{2}}}{x},$$

where x is the target undetermined value, c is the target value, s is the arc length of a transition curve segment, and R is the undetermined radius of curvature.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and those skilled in the art may obtain other figures according to these figures without paying creative work.

REFERENCE NUMERALS

1: back plate; 11: bearing surface; 111: circular arc segment; 112: first transition curve segment; 113: second transition curve segment; 114: first straight line segment; 115: second straight line segment.

DETAILED DESCRIPTION OF THE EMBODIMENTS

The technical solutions of the embodiments of the present disclosure will be clearly and thoroughly described below with reference to the drawings of the embodiments of the present disclosure. Apparently, the described embodiments are merely certain embodiments of the present disclosure, rather than all of the embodiments. All of the other embodiments obtained by those skilled in the art on the basis of the embodiments of the present disclosure without paying creative work fall within the protection scope of the present disclosure.

It should be understood that reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily referring to the same embodiment. Furthermore, the particular features, structures, or characteristics may be combined in any suitable manner in one or more embodiments.

Figure 1:
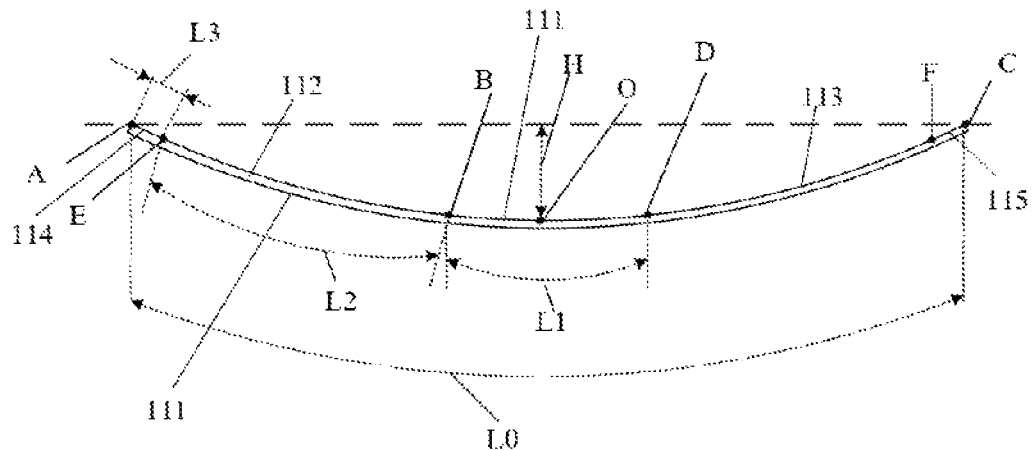
FIG. 1 is a schematic structural diagram illustrating a back plate included in a display module provided by an embodiment of the present disclosure.

FIG. 1 is a schematic structural diagram illustrating a back plate included in a display module provided by an embodiment of the present disclosure. The embodiment of the present disclosure provides a display module, including a back plate 1, a light guide plate fixed on the back plate 1, a rubber frame attached on the back plate 1 and a display panel located on the rubber frame. With reference to FIG. 1, the back plate 1 includes a bearing surface 11 and a back surface opposite to the bearing surface 11; the light guide plate is fixed on the bearing surface 11, a connecting line between two end portions of the bearing surface 11 forms a first curve, the first curve at least includes a circular arc segment 111 and a transition curve segment, and the first curve bends in a light emitting direction away from the display panel; the circular arc segment 111 is located at the middle of the first curve, and at least one end of the circular arc segment 111 is provided with a transition curve segment; the transition curve segment is located at a first position of the bearing surface 11, the first position being a position of the bearing surface 11 opposite to a second position of the display panel, and the second position being a position where light leaks from the display panel is located, and the radius of curvature of the transition curve gradually increases along the direction close to an end portion of the first curve.

The light guide plate uses an acrylic plate of optical grade as a basic raw material, and then a material having a very high reflectivity and not absorbing light is used to print light guide spots on the bottom surface of the acrylic plate of optical grade, so that the light guide plate may absorb the light emitted from the light emitting assembly.

The back plate 1 is a device for providing support for a display panel. In the embodiments of the present disclosure, the back plate 1 may be any of a stamped metal back plate, a glass back plate and a composite material back plate. In order to ensure that the back plate 1 has a good heat dissipation property, the back plate 1 may be a composite material back plate 1. During installation, it is necessary to control the gap between the heating element and the back plate 1 in the display module so as to ensure heat transfer.

In the case where the display panel is pressed or squeezed, the periphery of the display panel is slightly deformed, so that the liquid crystal in the display panel is locally distorted, and dark state light leakage occurs under a black picture of the display panel. However, in the case of aspheric bending of the display panel, that is, the display surface of the curved display panel includes an arc surface and a flat surface, the area where light leakage occurs is generally located in a critical position between the arc surface and the flat surface of the display panel.

In view of this, in the embodiments of the present disclosure, the back plate 1 includes the bearing surface 11 and a back surface opposite to the bearing surface 11; the light guide plate is fixed on the bearing surface 11, a connecting line between two end portions of the bearing surface 11 forms a first curve, that is, the top portion of the cross-section of the back plate 1 in a direction perpendicular to the display surface of the display panel is a first curve, and the first curve is bent in the light emitting direction away from the display panel. As such, the bending direction of the first curve coincides with the bending direction of the display panel.

The first curve includes at least a circular arc segment 111 and a transition curve segment, the circular arc segment 111 is a circular arc curve with a same radius of curvature, and the transition curve segment is a parabolic curve with gradually changed radius of curvature, which gradually increases in a direction close to the end portion of the first curve. The circular arc segment 111 is located at the middle of the first curve, that is, a midpoint of the circular arc segment 111 coincides with the midpoint of the first curve. At least one end of the circular arc segment 111 is provided with a transition curve segment, that is, the transition curve segment may include one segment or two segments, and the embodiments of the present disclosure are not limited thereto.

It should be noted that since the transition curve segment is located at a first position of the bearing surface 11, the first position being a position of the bearing surface 11 opposite to a second position of the display panel, and the second position being a position where the area where light leaks from the display panel, the transition curve segment and the area where light leaks from the display panel are located at opposite positions, as such, the stress generated at the critical position between the arc surface and the flat surface of the display panel in the case of aspheric bending of the display panel may be dispersed by the transition curve segment, thereby avoiding stress concentration.

It can be seen from the above-mentioned embodiments that in the embodiments of the present disclosure, since the transition curve segment is located at a first position of the bearing surface 11, the first position being a position of the bearing surface 11 opposite to a second position of the display panel, and the second position being a position where light leaks from the display panel, the transition curve segment and the area where light leaks from the display panel are located at opposite positions. In addition, since the transition curve segment and the area where light leaks from the display panel are located at opposite positions, the stress generated at the critical position between the arc surface and the flat surface of the display panel in the case of aspheric bending of the display panel may be dispersed along the bending direction of the transition curve segment. As such, in the case where the display panel is pressed or squeezed to generate an aspheric bending, the stress may be dispersed by the curve segments of the back plate 1, so that the stress concentration can be avoided, thereby reducing the stress generated by the display panel at the critical position between the arc surface and the flat surface, improving the problem of light leakage of the display module, and improving the display effect of the display module.

Next, the curve distribution and parameter properties of each segment of the first curve segment are described below in detail, and the details are as follows:

In some embodiments, the first curve includes a first transition curve segment 112, a second transition curve segment 113; the first transition curve segment 112 and the second transition curve segment 113 are respectively located at two ends of the circular arc segment 111, and the first transition curve segment 112 and the second transition curve segment 113 are both located at a position of the bearing surface 11.

It should be noted that since the first transition curve segment 112 and the second transition curve segment 113 are respectively located at two ends of the circular arc segment 111, both sides of the circular arc segment 111 are provided with a transition curve segment. In this way, two areas where light leaks from the display panel may be respectively located opposite to the first transition curve segment 112 and the second transition curve segment 113. Accordingly, the first transition curve segment 112 and the second transition curve segment 113 may respectively be located opposite to two critical positions between curved surfaces and flat surfaces of the display panel. Therefore, the problem of light leakage of the display module is further improved, so that the display effect of the display module is further improved.

Furthermore, in some embodiments, the first curve further includes a first straight line segment 114 and a second straight line segment 115. The first straight line segment 114 is located at an end portion of the first transition curve, the second straight line segment 115 is located at an end portion of the second transition curve, and the first straight line segment 114 and the second straight line segment 115 are respectively located at both end portions of the first curve.

It should be noted that the first straight line segment 114 is located at the end portion of the first transition curve segment 112, that is, the first straight line segment 114 is located at the end portion of the first transition curve segment 112 distal to the circular arc segment 111, and the second straight line segment 115 is located at the end portion of the second transition curve segment 113, that is, the second straight line segment 115 is located at the end portion of the second transition curve segment 113 distal to the circular arc segment 111, so that the first straight line segment 114 and the second straight line segment 115 are located at both end portions of the first curve. In this way, both end portions of the bearing surface 11 of the back plate 1 are flat surfaces, that is, the flat surfaces may be positioned opposite to the flat surface portions of the display panel in the case of aspheric bending of the display panel, thereby avoiding providing a certain support to the display panel when the display panel is bent.

Further, the first straight line segment 114 is tangent to an end point of the first transition curve segment 112 distal to the circular arc segment 111; the second straight line segment 115 is tangent to an end point of the second transition curve segment 113 distal to the circular arc segment 111. It should be noted that, in the case where the first straight line segment 114 is tangent to the end point of the first transition curve segment 112 distal to the circular arc segment 111, and the second straight line segment 115 is tangent to the end point of the second transition curve segment 113 distal to the circular arc segment 111, on the one hand, the flatness of the flat surface portion of the display panel in the case of aspheric bending and the flatness of the flat surface portion of the bearing surface 11 of the back plate 1 may be ensured to be equal, so as to ensure the supporting effect of the back plate 1 on the display panel, and on the other hand, the back plate 1 may be made to disperse the stress of the display panel, i.e. may be dispersed to the outside along the first straight line segment 114 and the second straight line segment 115, further avoiding stress concentration. It should be noted that two end points of the first straight line segment 114 are shown as point A and point E in FIG. 1, two end points of the second straight line segment 115 are shown as point C and point F in FIG. 1, and two end points of the first transition curve segment 112 are shown as point B and point E in FIG. 1, where point E is an intersection point of the first transition curve segment 112 and the first straight line segment 114; two end points of the second transition curve segment 113 are shown as point D and point F in FIG. 1, where point F is an intersection point of the second transition curve segment 113 and the second straight line segment 115. Two end points of the circular arc segment 111 are shown as point B and point D in FIG. 1, where point B is an intersection point of the first transition curve segment 112 and the circular arc segment 111, and point D is an intersection point of the second transition curve segment 113 and the circular arc segment 111.

In some embodiments, the first transition curve segment 112 and the second transition curve segment 113 are symmetrically distributed on both sides of the circular arc segment 111, and a center of the circular arc segment 111 coincides with a center of the first curve. As such, both sides of the circular arc segment 111 are provided with the transition curve segment, thereby ensuring that the first transition curve segment 112 and the second transition curve segment 113 may respectively be located opposite to two critical positions between the curved surface and the flat surface of the display panel, thereby ensuring that the problem of light leakage of the display panel is further improved. It should be noted that the center of the circular arc segment 111 is point O in FIG. 1.

Further, the radius of curvature of the first transition curve segment 112 at a first point is equal to the radius of curvature of the second transition curve segment 113 at a second point. The distance between the first point and the center point of the circular arc segment 111 is equal to the distance between the second point and the center point of the circular arc segment 111. As such, the curvatures of the transition curve at points located at equal distances from both sides of the circular arc segment 111 may be equal, thereby ensuring that the first transition curve segment 112 and the second transition curve segment 113 have the same effect on improving the light leakage of the display panel.

In some embodiments, an arc length of the circular arc segment 111 is equal to one quarter of the arc length of the first curve.

It should be noted that since a total arc length of the first curve may be determined on the basis of the degree of bending of the back plate 1 and the size of the back plate 1, in the case where the arc length of the circular arc segment 111 is equal to a quarter of the arc length of the first curve, on the one hand the size of the circular arc segment 111 may be determined, and on the other hand, sufficient size may be reserved for the transition curve segments. The arc length of the circular arc segment 111 is shown as L1 in FIG. 1, and the arc length of the first curve is shown as L0 in FIG. 1.

In addition, the arc length of the transition curve segment is equal to three-eighths of the arc length of the first curve.

It should be noted that since the total arc length of the first curve may be determined on the basis of the degree of bending of the back plate 1 and the size of the back plate 1, in the case where the arc length of the transition curve segment is equal to three-eighths of the arc length of the first curve, on the one hand, the size of the transition curve segment may be determined, and on the other hand, the proportion of the transition curve segment may be ensured, thereby ensuring that the problem of light leakage of the display panel is further improved. The arc length of the transition curve segment is shown as L2 in FIG. 1, and the arc length of the first curve is shown as L0 in FIG. 1.

It can be seen from the above-mentioned embodiments that in the embodiments of the present disclosure, since the transition curve segment is located at a first position of the bearing surface 11, the first position being a position of the bearing surface 11 opposite to a second position of the display panel, and the second position being a position where light leaks from the display panel, the transition curve segment and the area where light leaks in the display panel are located at opposite positions. Further, since the transition curve segment and the area where light leaks in the display panel are located at opposite positions, the stress generated at the critical position between the arc surface and the flat surface of the display panel in the case of aspheric bending of the display panel may be dispersed along the bending direction of the transition curve segment. As such, in the case where the display panel is pressed or squeezed to generate an aspheric bending, the stress may be dispersed by the transition curve segments of the back plate 1, so that the stress concentration can be avoided, thereby reducing the stress generated by the display panel at the critical position between the arc surface and the flat surface, improving the problem of light leakage of the display module, and improving the display effect of the display module.

Further, embodiments of the present disclosure also provide a display device including a display module as described in any of the embodiments above. Advantageous effects provided by the display device are consistent with the advantageous effects of the display module described in the above-mentioned embodiments, and the present embodiment will not be described in detail.

Figure 2:
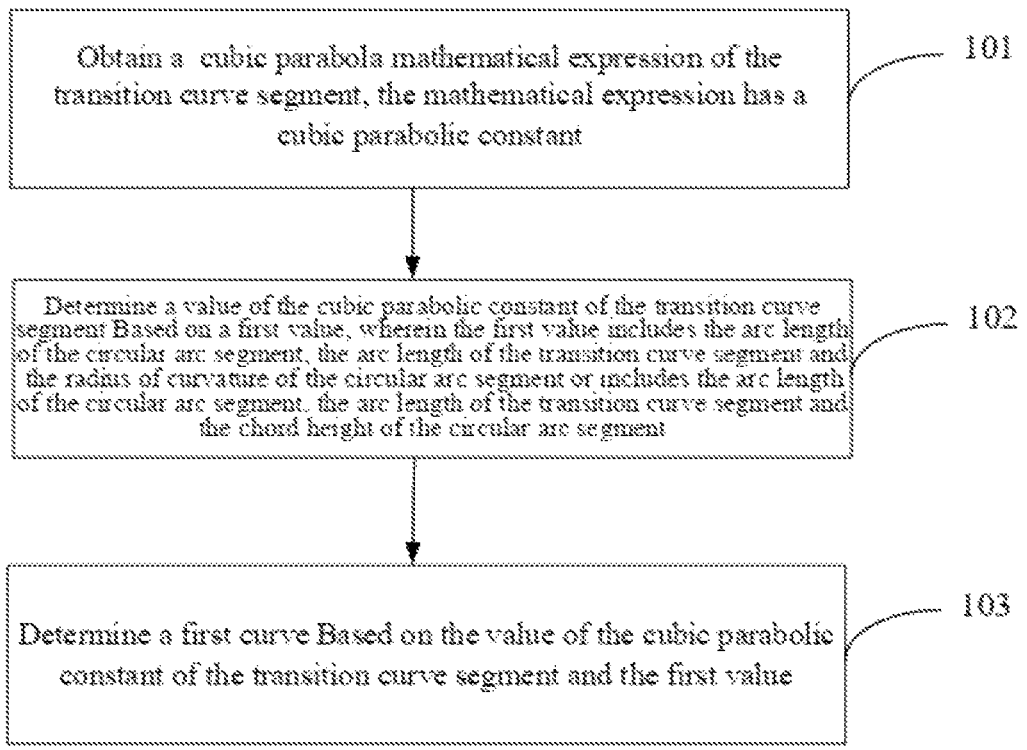
FIG. 2 is a first schematic flow chart of a calculation method provided by an embodiment of the present disclosure.

Embodiments of the present disclosure also provide a calculation method for calculating the first curve in any of the embodiments described above. As shown in FIG. 2, the calculation method includes steps described below.

At step 101, a cubic parabola mathematical expression of a transition curve segment is obtained, and the mathematical expression includes a cubic parabolic constant.

It should be noted that the cubic parabola mathematical expression of the transition curve segment is $$y = \frac{x^2}{6C},$$

where C represents the cubic parabolic constant.

At step 102, a value of the cubic parabolic constant of the transition curve segment is determined based on a first value, where the first value includes an arc length of the circular arc segment 111, an arc length of the transition curve segment and a radius of curvature of the circular arc segment 111, or includes the arc length of the circular arc segment 111, the arc length of the transition curve segment and a chord height of the circular arc segment 111.

It should be noted that when determining the value of the cubic parabolic constant of the transition curve segment, the value of the cubic parabolic constant may be determined based on the arc length of the circular arc segment 111, the arc length of the transition curve segment and the radius of curvature of the circular arc segment 111, or the value of the cubic parabolic constant may also be determined based on the arc length of the circular arc segment 111, the arc length of the transition curve segment and the chord height of the circular arc segment 111. The specific parameters are determined according to known conditions in practical applications, and the embodiments of the present disclosure are not limited thereto.

At step 103, a first curve is determined based on the value of the cubic parabolic constant of the transition curve segment and the first value.

Specifically, in the case where the first value is determined, the trajectory of the whole first curve may be determined only if the cubic parabolic constant of the transition curve is determined, and then the curvature of the bearing surface 11 of the back plate 1 at any position may be determined, so that the bearing surface 11 of the back plate 1 may achieve the effect of solving the problem of light leakage of the display panel.

It can be seen from the above-mentioned embodiments that in the embodiments of the present disclosure, by obtaining the mathematical expression of the cubic parabola of the transition curve, a first curve is determined based on the value of the cubic parabolic constant of the transition curve and the first value, so that the trajectory of the whole first curve may be determined, and then the curvature of the bearing surface 11 of the back plate 1 at any position may be determined, so that the bearing surface 11 of the back plate 1 may achieve the effect of solving the problem of light leakage of the display panel.

Figure 3:
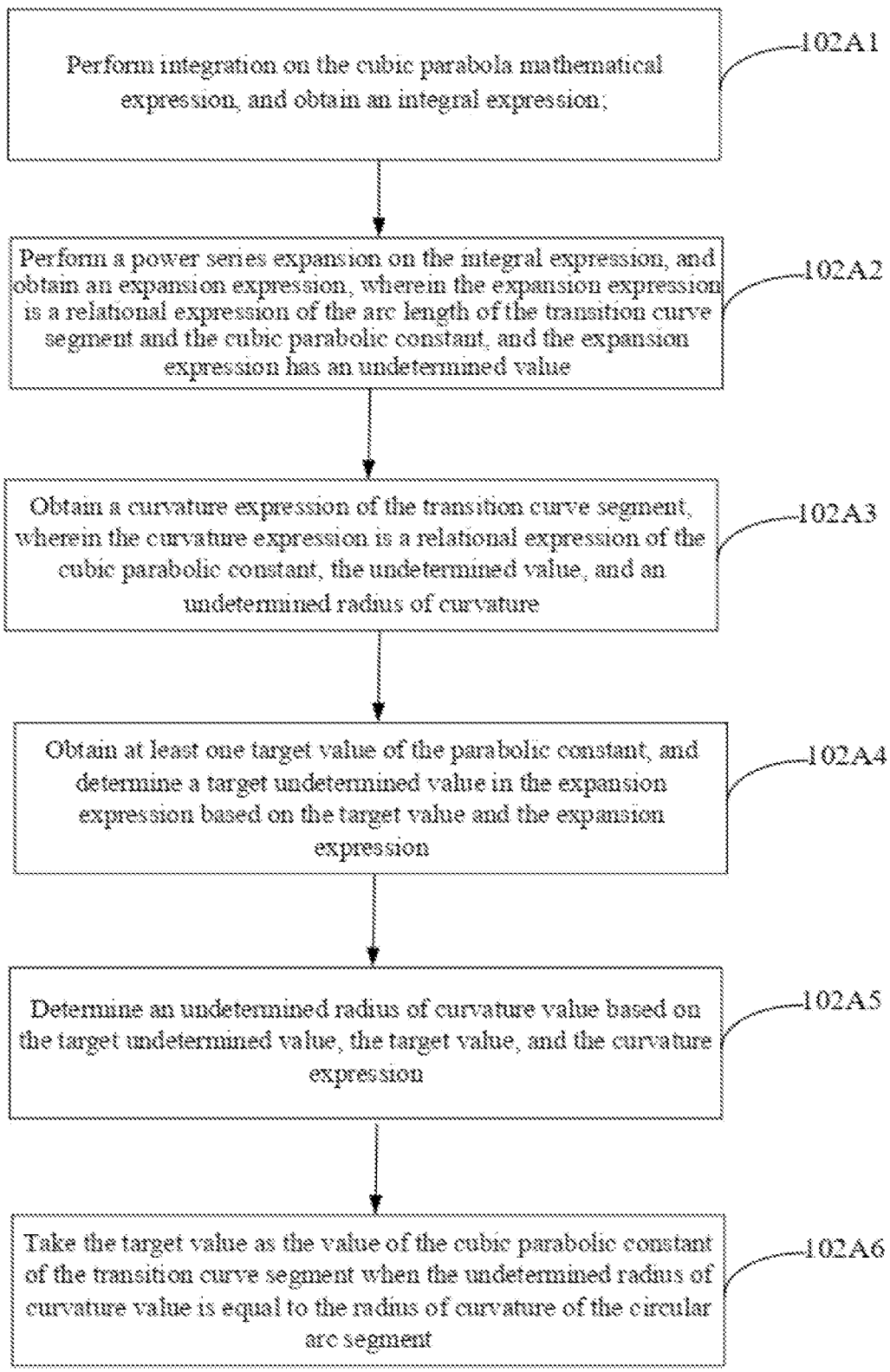
FIG. 3 is a second schematic flow chart of a calculation method provided by an embodiment of the present disclosure.

In one possible implementation, in the case where the first value includes the arc length of the circular arc segment 111, the arc length of the transition curve segment, and the radius of curvature of the circular arc segment 111, as shown in FIG. 3, step 102 may include steps described below.

At step 102A1, integration is performed on the cubic parabola mathematical expression, and an integral expression is obtained.

Figure 5:
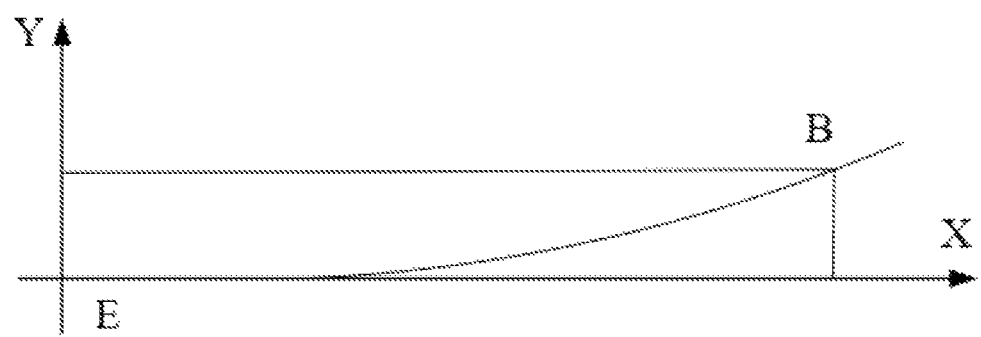
FIG. 5 is a parabolic curve graph of a transition curve segment provided by an embodiment of the present disclosure.

It should be noted that the cubic parabola mathematical expression of the transition curve segment is $$y = \frac{x^2}{6C},$$

where C represents the cubic parabolic constant. That is, the arc length of the transition curve segment may be obtained by performing integration on the mathematical expression of the cubic parabola. Illustratively, a parabolic curve graph of the transition curve segment is shown in FIG. 5, that is, by integrating the mathematical expression of the parabolic curve of the transition curve segment, the arc length of the B-E segment may be obtained, that is, the arc length of the transition curve segment may be obtained. Point E is set at the point (0, 0) of the parabolic curve of the transition curve, and point B is the intersection point of the transition curve segment and the circular arc segment 111.

At step 102A2, power series expansion is performed on the integral expression, and an expansion expression is obtained. The expansion expression is a relational expression between the arc length of the transition curve segment and the cubic parabolic constant, and the expansion expression has an undetermined value.

It should be noted that in the process of power series expansion, terms that do not affect the accuracy, i.e. terms that do not include ordinate, may be removed. In this step, a relational expression including only the cubic parabolic constant, the arc length of the transition curve segment and the abscissa of the parabolic curve graph of the transition curve segment being an unknown may be obtained. The expansion expression having an undetermined value represents the abscissa corresponding to the parabolic curve graph of the transition curve segment, i.e. the value X in FIG. 5.

At step 102A3, a curvature expression for a transition curve segment is obtained. The curvature expression is a relational expression between the cubic parabolic constant, an undetermined value, and an undetermined radius of curvature.

At step 102A4, at least one target value of the parabolic constant is obtained, and a target undetermined value in the expansion expression is determined on based on the target value and the expansion expression.

It should be noted that, in this step, a target value, i.e. an initial cubic parabolic constant value, may first be assigned by an iterative method. Since the arc length of the transition curve segment is known, that is, the abscissa value of point B in the parabolic curve graph of the curve in FIG. 5 may be calculated according to the expansion expression, that is, the target undetermined value in the expansion expression may be determined. Point P is the intersection point of the transition curve segment and the circular arc segment 111, that is, the target undetermined value is the same solution of the expansion expression and the curvature expression.

At step 102A5, an undetermined radius of curvature value is determined based on the target undetermined value, the target value, and the curvature expression.

It should be noted that, in this step, since the curvature expression is a relational expression including only the cubic parabolic constant, the abscissa of the parabolic curve graph of the transition curve and a relational expression with the radius of curvature of the circular arc segment 111 being unknown, the radius of curvature value of one circular arc segment 111 may be obtained by substituting the target undetermined value (the abscissa of the point P of the parabolic curve graph of the transition curve) and the target value of the parabolic constant into the curvature expression, that is, the undetermined radius of curvature value may be determined.

At step 102A6, when the undetermined radius of curvature value is equal to the radius of curvature of the circular arc segment 111, the target value is used as the value of the cubic parabolic constant of the transition curve segment.

It should be noted that, after determining the undetermined radius of curvature value, the undetermined radius of curvature value may be compared with the known radius of curvature of the circular arc segment 111, and if the undetermined radius of curvature value is not equal to the radius of curvature of the circular arc segment 111, the above-mentioned target value (a cubic parabolic constant value) needs to be adjusted. Steps 102A4 and 102A5 are re-performed to reacquire an undetermined radius of curvature value. Since determining that the undetermined radius of curvature value increases with the increase of the target value, when the undetermined radius of curvature value is greater than the radius of curvature of the circular arc segment 111, the target value is decreased, and when the undetermined radius of curvature value is less than the radius of curvature of the circular arc segment 111, the target value is increased until the calculated the undetermined radius of curvature value is equal to the radius of curvature of the circular arc segment 111, that is, the target value may be taken as the value of the cubic parabolic constant of the transition curve segment. As such, the trajectory of the first curve may be calculated on the basis of the first value and the determined value of the cubic parabolic constant, and then the curved surface trajectory of the bearing surface 11 of the back plate 1 may be determined, so as to ensure that the bearing surface 11 of the back plate 1 may achieve the effect of solving the problem of light leakage of the display panel.

Specifically, in this embodiment, the above-mentioned expansion expression is:

$$x + \frac{x^5}{40c^2} - \frac{x^9}{1152c^4} + \frac{x^{13}}{13312c^6} - \frac{x^{17}}{111411.2c^8} = S;$$

The curvature expression is:

$$R = \frac{c\left(1 + \frac{x^4}{4c^2}\right)^{\frac{3}{2}}}{x};$$

where x is the target undetermined value, c is the target value, s is the arc length of the transition curve segment, and R is the undetermined radius of curvature.

Figure 4:
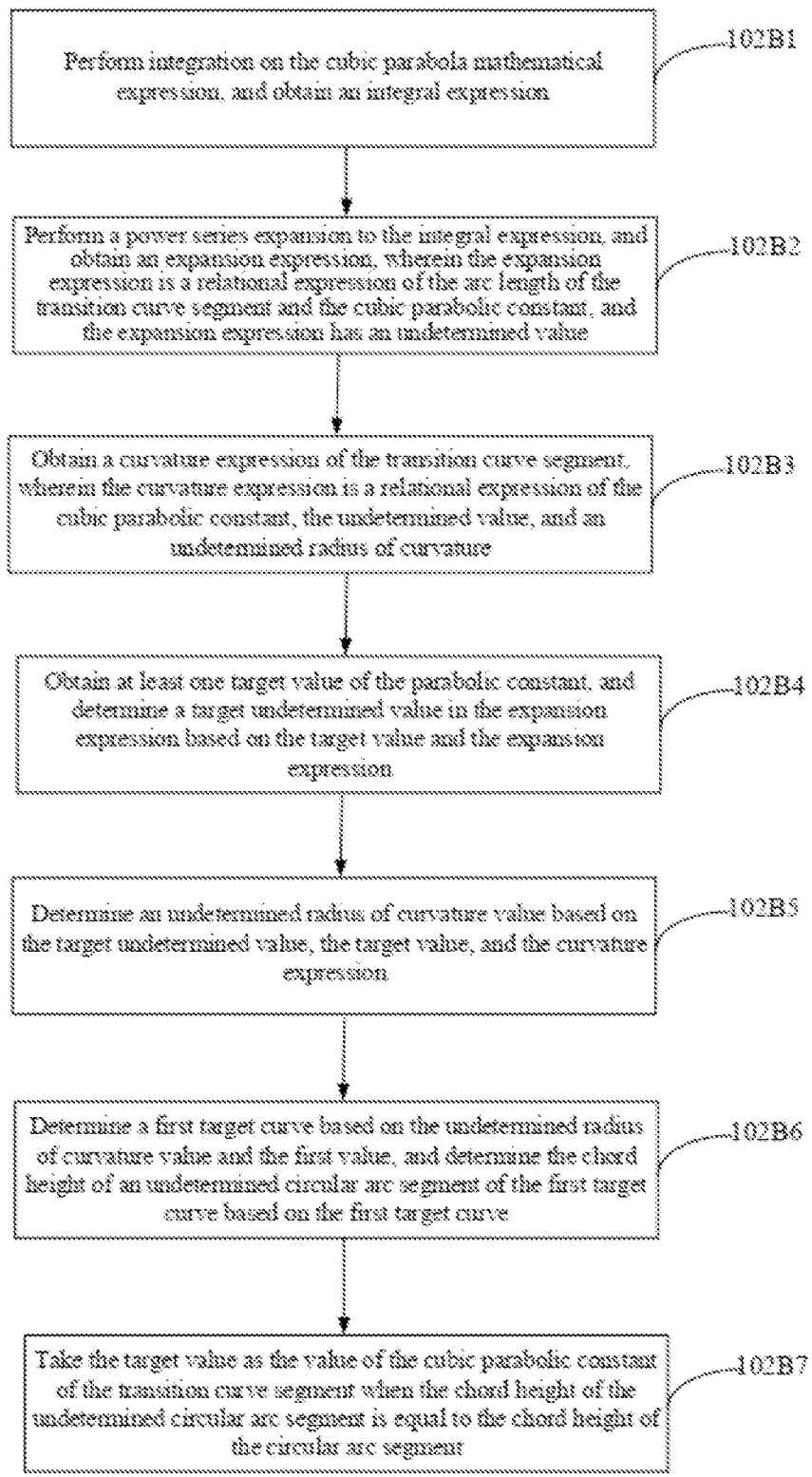
FIG. 4 is a third schematic flow chart of a calculation method provided by an embodiment of the present disclosure.

In another possible implementation, in the case where the first value includes the arc length of the circular arc segment 111, the arc length of the transition curve segment and the chord height of the circular arc segment 111, as shown in FIG. 4, step 102 may include the steps described below.

At step 102B1, integration is performed on the cubic parabola mathematical expression, and the integral expression is obtained.

At step 102B2, the power series expansion is performed on the integral expression, and the expansion expression is obtained. The expansion expression is the relational expression between the arc length of the transition curve segment and the cubic parabolic constant, and the expansion expression has an undetermined value.

At step 102B3, a curvature expression for a transition curve segment is obtained. The curvature expression is a relational expression between a cubic parabolic constant, an undetermined value, and an undetermined radius of curvature.

At step 102B4, at least one target value of the parabolic constant is obtained, and a target undetermined value in the expansion expression is determined based on the target value and the expansion expression.

At step 102B5, an undetermined radius of curvature value is determined based on the target undetermined value, the target value, and the curvature expression.

It should be noted that step 102B1 to step 102B5 are the same as step 102A1 to step 102A5 described above, and will not be described in detail.

At step 102B6, a first target curve is determined based on the undetermined radius of curvature value and the first value, and a chord height of the undetermined circular arc segment 111 of the first target curve is determined based on the first target curve.

It should be noted that, after obtaining the undetermined radius of curvature value and the target value, as well as the above-mentioned first value, the first target curve may be drawn by using a cartographic software, and the chord height of the undetermined circular arc segment 111 of the first target curve may be determined by measuring the chord height of the first target curve.

At step 102B7, when the chord height of the undetermined circular arc segment 111 is equal to that of the circular arc segment 111, the target value is used as the value of the cubic parabolic constant of the transition curve segment.

It should be noted that, after determining the chord height of the undetermined circular arc segment 111 of the first target curve, the chord height of the undetermined circular arc segment 111 may be compared with the chord height of the known circular arc segment 111, and if the chord height of the undetermined circular arc segment 111 is not equal to that of the known circular arc segment 111, the above-mentioned target value (a cubic parabolic constant value) needs to be adjusted. Steps 102B4 to 102B6 are re-performed to reacquire the chord height of an undetermined circular arc segment 111. Since the chord height of the undetermined circular arc segment 111 increases with the increase of the target value, when the chord height of the undetermined circular arc segment 111 is greater than the chord height of the known circular arc segment 111, the target value is decreased; and when the chord height of the undetermined circular arc segment 111 is less than the chord height of the known circular arc segment 111, the target value is increased until the calculated chord height of the undetermined circular arc segment 111 is equal to the chord height of the circular arc segment 111, that is, the target value may be taken as the value of the cubic parabolic constant of the transition curve. As such, the trajectory of the first curve may also be calculated on the basis of the first value and the determined value of the cubic parabolic constant, and then the curved surface trajectory of the bearing surface 11 of the back plate 1 may be determined, so as to ensure that the bearing surface 11 of the back plate 1 may achieve the effect of solving the problem of light leakage of the display panel. Wherein, the chord height of the circular arc segment 111 is shown as H in FIG. 1.

Specifically, in this embodiment, the expansion expression is:

$$x + \frac{x^8}{40c^2} - \frac{x^9}{1152c^4} + \frac{x^{12}}{13312c^6} - \frac{x^{17}}{111411.2c^8} = S$$

The curvature expression is:

$$R = \frac{c\left(1 + \frac{x^4}{4c^2}\right)^{\frac{2}{3}}}{x};$$

where x is the target undetermined value, c is the target value, s is the arc length of the transition curve segment, and R is the undetermined radius of curvature.

It should be noted that the above-mentioned calculation method for the first curve is merely an exemplary calculation method for the first curve according to the embodiments of the present disclosure, when calculating the first curve, the calculation may also be performed by means of a clothoid, a seven-order quadrinomial, etc., and the embodiments of the present disclosure are not limited thereto.

It should be noted that various embodiments in the specification are described in a progressive manner, each embodiment focuses on the difference from other embodiments, and the same and similar parts of various embodiments can be referred to each other.

Although optional embodiments of the present disclosure have been described, additional changes and modifications to these embodiments may be made by those skilled in the art once the basic creative concept is appreciated. Therefore, the appended claims are intended to be construed to cover optional embodiments and all changes and modifications that fall within the scope of the disclosed embodiments.

Finally, it should be noted that, in the present disclosure, relationship terms such as first and second are only used to distinguish one entity from another entity, and do not necessarily require or imply any such actual relationship or sequence exists between these entities. The terms "comprising", "including" or any other variation thereof are intended to encompass non-exclusive inclusion, so that a product or terminal device including a list of elements includes not only those elements, but also other not expressly listed elements, or also include elements inherent to such the product or terminal device. Without further limitation, an element defined by the phrase "comprising a . . . " does not preclude the presence of additional identical elements in the product or terminal device including the element.

The technical solutions provided by the present disclosure have been introduced in detail above. Herein, specific examples are used to illustrate the principles and implementation methods of the present disclosure. Meanwhile, for those skilled in the art, changes in specific implementation methods and application scopes may be made based on the principles and implementation methods of the present disclosure. To sum up, the contents of this specification should not be construed as limiting the present disclosure.

The invention claimed is:

1. A display module, comprising a back plate, a light guide plate fixed on the back plate, a rubber frame attached on the back plate and a display panel disposed on the rubber frame, wherein the back plate comprises a bearing surface and a back surface opposite to the bearing surface;
   wherein the light guide plate is fixed on the bearing surface, a connecting line between two end portions of the bearing surface forms a first curve, the first curve comprises at least a circular arc segment and a transition curve segment, and the first curve bends in a direction away from the display panel;
   wherein the circular arc segment is located at a middle of the first curve, and at least one end of the circular arc segment is provided with the transition curve segment;
   wherein the transition curve segment is located at a first position of the bearing surface, the first position being a position of the bearing surface opposite to a second position of the display panel, and the second position being a position where light leaks from the display panel, and a radius of curvature of the transition curve segment gradually increases along a direction close to an end portion of the first curve.

2. The display module according to claim 1, wherein the first curve comprises a first transition curve segment and a second transition curve segment;
   wherein the first transition curve segment and the second transition curve segment are respectively located at both ends of the circular arc segment, and the first transition curve segment and the second transition curve segment are both located at a position of the bearing surface.

3. The display module according to claim 2, wherein the first curve further comprises a first straight line segment and a second straight line segment;
   wherein the first straight line segment is located at an end portion of the first transition curve segment, the second straight line segment is located at an end portion of the second transition curve segment, and the first straight line segment and the second straight line segment are respectively located at both end portions of the first curve.

4. The display module according to claim 3, wherein the first straight line segment is tangent to an end point of the first transition curve segment distal to the circular arc segment;
   wherein the second straight line segment is tangent to an end point of the second transition curve segment distal to the circular arc segment.

5. The display module according to claim 2, wherein the first transition curve segment and the second transition curve segment are symmetrically distributed on both sides of the circular arc segment, and a center of the circular arc segment coincides with a center of the first curve.

6. The display module according to claim 5, wherein a radius of curvature of the first transition curve segment at a first point is equal to a radius of curvature of the second transition curve segment at a second point, wherein a distance between the first point and the center point of the circular arc segment is equal to a distance between the second point and the center point of the circular arc segment.

7. The display module according to claim 1, wherein an arc length of the circular arc segment is equal to one quarter of an arc length of the first curve.

8. The display module according to claim 1, wherein an arc length of the transition curve segment is equal to three-eighths of an arc length of the first curve.

9. A calculation method for calculating the first curve according to claim 1, wherein the calculation method comprises:
obtaining a cubic parabola mathematical expression of the transition curve segment, wherein the mathematical expression has a cubic parabolic constant;
determining a value of the cubic parabolic constant of the transition curve segment based on a first value, wherein the first value comprises an arc length of the circular arc segment, an arc length of the transition curve segment and a radius of curvature of the circular arc segment, or the first value comprises the arc length of the circular arc segment, the arc length of the transition curve segment and a chord height of the circular arc segment; and
determining the first curve based on the value of the cubic parabolic constant of the transition curve segment and the first value.

10. The calculation method according to claim 9, wherein in the case where the first value comprises the arc length of the circular arc segment, the arc length of the transition curve segment, and the radius of curvature of the circular arc segment, the determining a value of the cubic parabolic constant of the transition curve segment based on a first value comprises:
performing integration on the cubic parabola mathematical expression, and obtaining an integral expression;
performing a power series expansion on the integral expression, and obtaining an expansion expression, wherein the expansion expression is a relational expression of the arc length of the transition curve segment and the cubic parabolic constant, and the expansion expression has an undetermined value;
obtaining a curvature expression of the transition curve segment, wherein the curvature expression is a relational expression of the cubic parabolic constant, the undetermined value, and an undetermined radius of curvature;
obtaining at least one target value of the parabolic constant, and determining a target undetermined value in the expansion expression based on the target value and the expansion expression;
determining an undetermined radius of curvature value based on the target undetermined value, the target value, and the curvature expression; and
when the undetermined radius of curvature value is equal to the radius of curvature of the circular arc segment, taking the target value as the value of the cubic parabolic constant of the transition curve segment.

11. The calculation method according to claim 10, wherein the expansion expression is:

$$x + \frac{x^5}{40c^2} - \frac{x^9}{1152c^4} + \frac{x^{13}}{13312c^6} - \frac{x^{17}}{111411.2c^8} = S;$$

the curvature expression is:

$$R = \frac{c\left(1 + \frac{x^4}{4c^2}\right)^{\frac{3}{2}}}{x};$$

where x is the target undetermined value, c is the target value, s is the arc length of the transition curve segment, and R is the undetermined radius of curvature.

12. The calculation method according to claim 9, wherein in the case where the first value comprises the arc length of the circular arc segment, the arc length of the transition curve segment and the chord height of the circular arc segment, the determining a value of the cubic parabolic constant of the transition curve segment based on a first value comprises:
performing integration on the cubic parabola mathematical expression, and obtaining an integral expression;
performing a power series expansion to the integral expression, and obtaining an expansion expression, wherein the expansion expression is a relational expression of the arc length of the transition curve segment and the cubic parabolic constant, and the expansion expression has an undetermined value;
obtaining a curvature expression of the transition curve segment, wherein the curvature expression is a relational expression of the cubic parabolic constant, the undetermined value, and an undetermined radius of curvature;
obtaining at least one target value of the parabolic constant, and determining a target undetermined value in the expansion expression based on the target value and the expansion expression;
determining an undetermined radius of curvature value based on the target undetermined value, the target value, and the curvature expression;
determining a first target curve based on the undetermined radius of curvature value and the first value, and determining the chord height of an undetermined circular arc segment of the first target curve based on the first target curve; and
when the chord height of the undetermined circular arc segment is equal to the chord height of the circular arc segment, taking the target value as the value of the cubic parabolic constant of the transition curve segment.

13. The calculation method according to claim 12, wherein the expansion expression is:

$$x + \frac{x^5}{40c^2} - \frac{x^9}{1152c^4} + \frac{x^{13}}{13312c^6} - \frac{x^{17}}{111411.2c^8} = S;$$

the curvature expression is:

$$R = \frac{c\left(1 + \frac{x^4}{4c^2}\right)^{\frac{3}{2}}}{x};$$

where x is the target undetermined value, c is the target value, s is the arc length of a transition curve segment, and R is the undetermined radius of curvature.

14. A display device comprising a display module wherein the display module comprises a back plate, a light guide plate fixed on the back plate, a rubber frame attached on the back plate and a display panel disposed on the rubber frame, wherein the back plate comprises a bearing surface and a back surface opposite to the bearing surface;
   wherein the light guide plate is fixed on the bearing surface, a connecting line between two end portions of the bearing surface forms a first curve, the first curve comprises at least a circular arc segment and a transition curve segment, and the first curve bends in a direction away from the display panel;
   wherein the circular arc segment is located at a middle of the first curve, and at least one end of the circular arc segment is provided with the transition curve segment;
   wherein the transition curve segment is located at a first position of the bearing surface, the first position being a position of the bearing surface opposite to a second position of the display panel, and the second position being a position where light leaks from the display panel, and a radius of curvature of the transition curve segment gradually increases along a direction close to an end portion of the first curve.

15. The display device according to claim 14, wherein the first curve comprises a first transition curve segment and a second transition curve segment;
   wherein the first transition curve segment and the second transition curve segment are respectively located at both ends of the circular arc segment, and the first transition curve segment and the second transition curve segment are both located at a position of the bearing surface.

16. The display device according to claim 15, wherein the first curve further comprises a first straight line segment and a second straight line segment;
   wherein the first straight line segment is located at an end portion of the first transition curve segment, the second straight line segment is located at an end portion of the second transition curve segment, and the first straight line segment and the second straight line segment are respectively located at both end portions of the first curve.

17. The display device according to claim 16, wherein the first straight line segment is tangent to an end point of the first transition curve segment distal to the circular arc segment;
   wherein the second straight line segment is tangent to an end point of the second transition curve segment distal to the circular arc segment.

18. The display device according to claim 15, wherein the first transition curve segment and the second transition curve segment are symmetrically distributed on both sides of the circular arc segment, and a center of the circular arc segment coincides with a center of the first curve.

19. The display device according to claim 18, wherein a radius of curvature of the first transition curve segment at a first point is equal to a radius of curvature of the second transition curve segment at a second point, wherein a distance between the first point and the center point of the circular arc segment is equal to a distance between the second point and the center point of the circular arc segment.

20. The display device according to claim 14, wherein an arc length of the circular arc segment is equal to one quarter of an arc length of the first curve.

* * * * *